United States Patent [19]

Satoh

[11] 4,354,694
[45] Oct. 19, 1982

[54] PASSIVE SAFETY BELT DEVICE

[75] Inventor: Nobuo Satoh, Ohta, Japan

[73] Assignee: Fuji Jukogyo Kabushiki Kaisha, Tokyo, Japan

[21] Appl. No.: 158,176

[22] Filed: Jun. 10, 1980

[30] Foreign Application Priority Data

Jul. 17, 1979 [JP] Japan ............................. 54-98655[U]

[51] Int. Cl.³ ............................................ B60R 21/10
[52] U.S. Cl. ................................................ 280/802
[58] Field of Search ............... 280/802, 803, 808, 801; 297/469

[56] References Cited

U.S. PATENT DOCUMENTS 4,216,978  8/1980  Mauron ............................... 280/808
4,223,914  9/1980  Usami ................................. 280/808

FOREIGN PATENT DOCUMENTS 1509920  5/1978  United Kingdom ................ 280/803

Primary Examiner—Robert R. Song
Attorney, Agent, or Firm—Martin A. Farber

[57] ABSTRACT

A passive safety belt device for a vehicle having sash-less doors and a pair of seats, comprising a retractor provided on the floor between the seats, a door pole upwardly extends from a rear portion of the sash-less door, and a safety belt connected between the retractor and the door pole, the latter having an engaging hole. A latch bar is provided on the center pillar of the vehicle so as to engage with the engaging hole of the door pole in the closed position of the door. When the door is closed, the safety belt extends diagonally across the passenger's body, and when the door is opened, the safety belt is positioned to permit the passenger to get in and get out of the vehicle.

9 Claims, 4 Drawing Figures

PASSIVE SAFETY BELT DEVICE

BACKGROUND OF THE INVENTION

The present invention relates to a passive safety belt device for protecting a passenger seated in a vehicle, such as an automobile, from injury.

A passive safety belt device has been provided in which a safety belt is automatically fitted to the passenger's body by closing the door of the vehicle, such as an automobile, and the safety belt is automatically removed from the passenger's body by opening the door, whereby the passenger is enabled to get out of the vehicle.

A passive safety belt device in which a safety belt extends diagonally across the passenger's body from one shoulder to the opposite hip is preferably employed in vehicles and this kind of safety belt is known as a "shoulder belt". When providing an automatic passive safety belt device of the shoulder belt type, the safety belt is connected between a retractor provided on a floor of a central portion of the vehicle and an anchor attached to a sash of the door adjacent the seat. However, the safety belt cannot be provided in a vehicle having sash-less doors. In order to attach the safety belt to a vehicle with sash-less doors, a side rail is provided on an upper portion of the side of the vehicle body and the end of the safety belt is slidably engaged with the side rail. Further, a guiding device for moving the end of the safety belt longitudinally and a driving means for the guiding device are provided. Therefore, the conventional passive safety belt device is complicated in construction and expensive and requires considerable space for its installation.

SUMMARY OF THE INVENTION

The present invention seeks to provide a passive safety belt device which may be operated without any belt driving mechanism and belt guiding device, and which may reliably receive an impact load to ensure the passenger.

According to the present invention, there is provided a safety belt device for a vehicle having sash-less doors comprising a retractor provided in a lower portion of a central portion of the vehicle, a door pole upwardly extends from a rear portion of said sash-less door, an engaging hole is formed in said door pole, a safety belt is connected to said retractor and to said door pole at a portion near said engaging hole, and a latch bar is secured to an inside member of a center pillar so as to engage with said engaging hole of said door pole in the closed position of said sash-less door.

The present invention will be fully described with reference to the accompanying drawings.

DESCRIPTION OF THE PREFERRED EMBODIMENT

Figure 1:
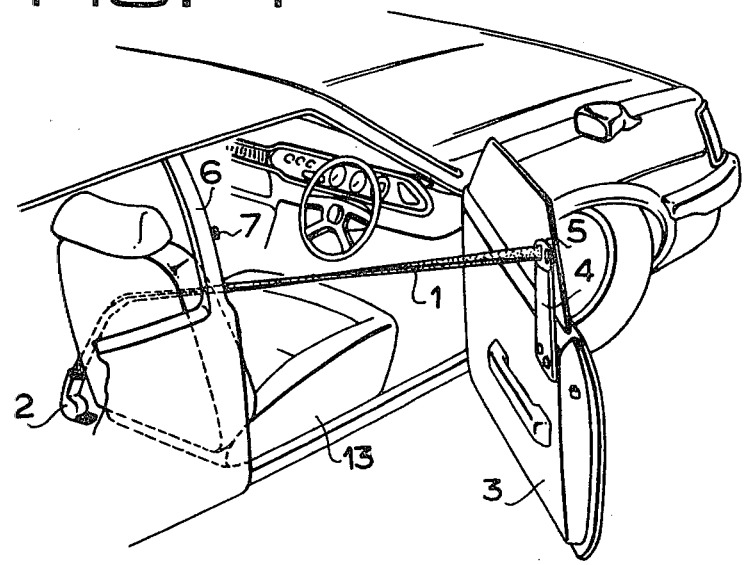
FIG. 1 is a perspective view showing an embodiment in an automobile according to the present invention.
Figure 2:
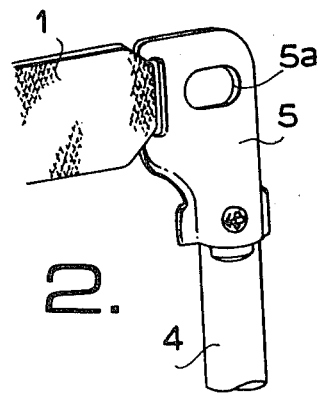
FIG. 2 is a side view showing a door pole portion of the device of FIG. 1.

Referring to FIG. 1, safety belt 1, has one end connected to a body member (such as a floor or a member secured to the floor) through a retractor 2 provided on a portion between seats 13, and the other end of the belt passes over the seat 13 and is connected to a plate 5 connected to a door pole 4. The door pole 4 is secured to a sash-less door 3 at an upper rear portion of the door body so as to upwardly project a predetermined height from the door body along the inside of a window. The plate 5 is secured to the door pole 4 by screws (unnumbered in FIG. 2) and has an engaging hole 5a as shown in FIG. 2.

Figure 3:
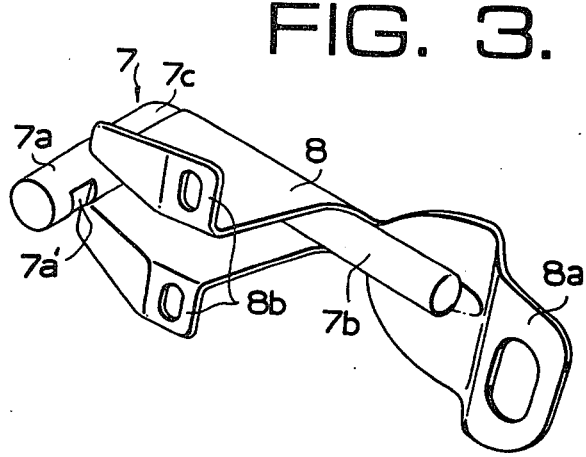
FIG. 3 is a perspective view of latch bar portion.
Figure 4:
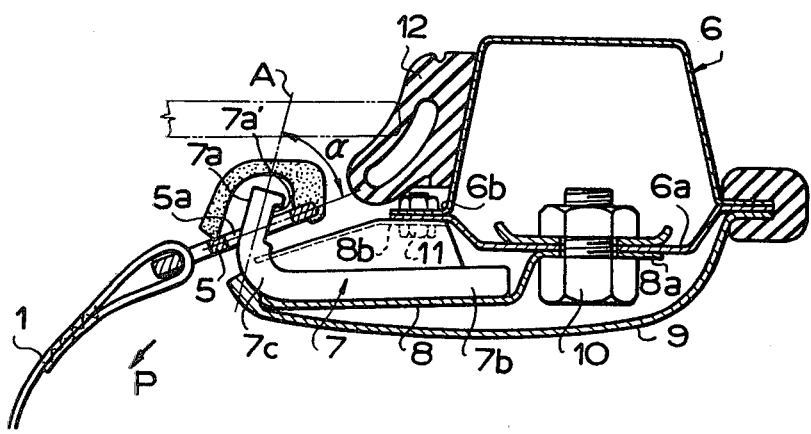
FIG. 4 is a sectional view showing an engaging condition between the door pole portion and the body portion.

On the other hand, a latch bar 7 is provided on a center pillar 6 of the body so as to engage with the hole 5a of the plate 5 as hereinafter described when the door 3 is closed. Referring to FIGS. 3 and 4, the latch bar 7 is made by bending a steel bar into an L-shape to thereby form an engaging portion 7a, a body portion 7b and a bent portion 7c. A reinforcement plate 8 covers the body portion 7b and bent portion 7c and is secured thereto by welding. The reinforcement plate 8 comprises an attaching portion 8a which is adapted to be secured to an inside plate 6a of the center pillar 6 and a pair of flange portions 8b which are adapted to be secured to a junction 6b of the inside plate 6a and outside plate of the center pillar 6. The attaching portion 8a is secured to the inside plate 6a by a bolt 10 and the flange portions 8b are secured to the junction 6b by bolts 11, so that the engaging portion 7a of the latch bar 7 is positioned to coincide with a locus "A" of the engaging hole 5a of the plate 5. The reinforcement plate 8 and the latch bar 7 are covered by an upholstery 9. Numeral 12 designates weather stripping.

In operation, when the door 3 is closed, the connecting portion of the safety belt to the door pole 4, 5 is positioned outside and behind the shoulder of the passenger and the safety belt 1 is wound in the retractor 2, so that the safety belt extends diagonally across the passenger from the shoulder to the hip to restrain the passenger's body at a predetermined pressure. As shown in FIG. 4, the engaging hole 5a of the plate 5 engages with the latch bar 7. Thus, an impact or collision force P may be received and absorbed by the center pillar 6 being transmitted through the latch bar 7 and the reinforcement plate 8. Accordingly, breakdown or deformation of the door pole 4 or the door 3 may be prevented.

Since the latch bar 7 is integrated with the reinforcement plate 8 and the reinforcement plate is secured to the center pillar 6 at two different positions, that is the inside plate 6a and the junction 6b, the latch bar 7 may be reinforced and the impact forces and load may be surely transmitted to the center pillar 6.

It is desirable that the plate 5 and the latch bar 7 are so arranged that the angle $\alpha$ between the plate 5 and the engaging portion 7a is acute. By such an arrangement, the engagement between the plate 5 and the latch plate 7 may be ensured and the plate may be disposed in a plane which is substantially aligned with the direction of the impact force P. Further, it is desirable to provide a notch 7a' in the engaging portion 7a as shown in the figures.

When the door 3 is opened, the door pole 4 moves to pull the safety belt 1 from the retractor 2 as shown in FIG. 1. Thus, the passenger may get in and get out of the vehicle.

From the foregoing, it will be observed that the invention provides a safety belt device for fastening and releasing the safety belt, which is simplified in construction. Since the connecting portion of the safety belt to the door is engaged with a latch bar provided in the vehicle body, such as a center pillar, in the fastening condition, the impact forces and load exerted on the safety belt may be positively transmitted to the vehicle body, whereby the passenger's safety may be guaranteed and breakdown or deformation of members such as door may be prevented.

What is claimed is:

1. A passive safety belt device for a vehicle having on each side a sash-less door and a center pillar with an inside member, comprising
    a retractor provided in a lower portion of a central portion of the vehicle,
    a door pole upwardly extending from a rear portion of said sash-less door and formed with an engaging hole in said door pole,
    a safety belt connected to said retractor and to said door pole at a portion adjacent said engaging hole,
    a latch bar secured to said inside member of said center pillar so as to engage with said engaging hole of said door pole in a closed position of said sash-less door, and
    a reinforcement plate constituting means for securing said latch bar to said inside member of the center pillar at a plurality of positions.

2. The passive safety belt device for a vehicle having sash-less doors according to claim 1 wherein
    said latch bar has an engaging portion which forms an acute angle with respect to the plane of said door pole in the closed position of the door.

3. The passive safety belt device according to claim 1, wherein
    said latch bar comprises an L-shaped steel bar having:
        an engaging portion engageable with said engaging hole of said door pole in the closed position of said door;
        a body portion, and
        a bent portion connecting said engaging portion and said body portion in one piece; and
        said engaging portion is formed with a notch in an inside portion of said engaging portion, said notch is engageable with said door pole in said engaging hole in the closed position of said door;
    said reinforcement plate comprises in one piece:
        a reinforcement body portion covering a portion of said body portion of said latch bar and secured thereto;
        an attaching portion at a rear end of said reinforcement portion remote from said engaging portion; and
        a pair of flange portions opposite said reinforcement body portion and extending therefrom,
        means for securing said attaching portion and said flange portions to said inside member of said center pillar at said plurality of positions so that said engaging portion engages with said engaging hole of said door pole in the closed position of said sash-less door.

4. The passive safety belt device according to claim 3, wherein
    said reinforcement plate is welded to said latch bar.

5. The passive safety belt device according to claim 3, wherein
    said securing means comprise bolts,
    said center pillar comprises,
    a bent plate forming an inside plate constituting said inside member connected to said attaching portion and said flange portions by said securing means, said inside plate forms flanges, and
    an outside plate having flanges engaging said flanges of said inside plate and cooperatively abut and form a junction facing a forward direction with respect to the vehicle,
    said securing means connect said junction to said pair of flange portions of said reinforcement plate such that said engaging portion of said latch bar is positioned to coincide with a locus of the engaging hole of said door pole in the closed position of the door.

6. The passive safety belt device according to claim 1, further comprising
    means for securing said reinforcement plate to said inside member of said center pillar at different positions on said inside plate, and
    said reinforcement plate is secured to said latch bar.

7. The passive safety belt device according to claim 3, wherein
    said door pole includes an upper plate having said engaging hole and connected to said safety belt, said plate and said engaging portion form an acute angle in the closed position of the door such that said plate is disposed in a plane which is substantially aligned with direction of an impact force on the seat belt.

8. The passive safety belt device according to claim 3, wherein
    said reinforcement body portion covers an outside portion of said body portion of said latch bar facing an interior of the vehicle and said pair of flange portions extends from said reinforcement body portion in a direction of projection of said engaging portion of said latch bar.

9. The passive safety belt device according to claim 1, wherein
    said door pole is rigidly non-moveably secured to an inside of said rear portion of said door,
    said safety belt is connected to said door pole at said portion thereof at an upper end of said door pole,
    said engaging hole is located at said upper end.

* * * * *